United States Patent
Morimoto et al.

(10) Patent No.: US 10,017,178 B2
(45) Date of Patent: Jul. 10, 2018

(54) VEHICLE CONTROL APPARATUS

(71) Applicant: TOYOTA JIDOSHA KABUSHIKI KAISHA, Toyota-shi, Aichi (JP)

(72) Inventors: Kazuhiro Morimoto, Toyota (JP); Katsuhiro Matsuoka, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/239,370

(22) Filed: Aug. 17, 2016

(65) Prior Publication Data

US 2017/0080930 A1 Mar. 23, 2017

(30) Foreign Application Priority Data

Sep. 18, 2015 (JP) .................. 2015-186046

(51) Int. Cl.
*B60W 30/14* (2006.01)
*B60W 30/18* (2012.01)
(Continued)

(52) U.S. Cl.
CPC ............ *B60W 30/14* (2013.01); *B60W 30/16* (2013.01); *B60W 30/181* (2013.01); *B60W 30/18154* (2013.01); *B60W 50/14* (2013.01); *B60W 2050/143* (2013.01); *B60W 2050/146* (2013.01); *B60W 2540/10* (2013.01);
(Continued)

(58) Field of Classification Search
CPC ............... B60W 30/14; B60W 30/181; B60W 30/18154; B60W 50/14; B60W 2600/00; B60W 2720/106; B60W 2550/20
See application file for complete search history.

(56) References Cited

U.S. PATENT DOCUMENTS

| 7,706,953 B1 * | 4/2010 | Sun ..................... B60K 31/042 123/399 |
| 2005/0143894 A1 * | 6/2005 | Wagner ............. B60K 31/0008 701/93 |

(Continued)

FOREIGN PATENT DOCUMENTS

| JP | 2002-373396 A | 12/2002 |
| JP | 2004-171459 A | 6/2004 |
| JP | 2006-318446 A | 11/2006 |

*Primary Examiner* — Rodney Allen Butler
(74) *Attorney, Agent, or Firm* — Oliff PLC

(57) ABSTRACT

A vehicle control apparatus of the invention is applied to a vehicle having at least one device configured to acquire a road situation information from an outside of the vehicle. The apparatus determines whether or not a particular situation regarding a vehicle traveling occurs on the basis of the road situation information. The particular situation being a situation that a driver of the vehicle should be alerted. The apparatus can perform an informing for alerting the driver and execute a cruise control for causing the vehicle to travel automatically without an operation of an acceleration operator of the vehicle. The apparatus performs the informing when the particular situation occurs, the cruise control is not executed and the acceleration operator is operated. The apparatus performs the informing when the particular situation occurs and the cruise control is executed, independently of whether or not the acceleration operator is operated.

4 Claims, 6 Drawing Sheets

(51) Int. Cl.
*B60W 50/14* (2012.01)
*B60W 30/16* (2012.01)

(52) U.S. Cl.
CPC ..... *B60W 2550/20* (2013.01); *B60W 2550/22* (2013.01); *B60W 2550/402* (2013.01); *B60W 2600/00* (2013.01); *B60W 2720/106* (2013.01)

(56) References Cited

U.S. PATENT DOCUMENTS

| | | | |
|---|---|---|---|
| 2005/0171674 A1* | 8/2005 | Wang | B60K 31/04 701/93 |
| 2006/0235615 A1 | 10/2006 | Kato et al. | |
| 2008/0272898 A1* | 11/2008 | Irion | B60Q 9/008 340/436 |
| 2011/0169625 A1* | 7/2011 | James | B60Q 9/008 340/439 |
| 2015/0251667 A1* | 9/2015 | Lu | B60W 50/16 701/53 |
| 2016/0318490 A1* | 11/2016 | Ben Shalom | B60T 7/12 |

* cited by examiner

VEHICLE CONTROL APPARATUS

BACKGROUND OF THE INVENTION

Field of the Invention

The present invention relates to a vehicle control apparatus which has a function for causing a vehicle to travel automatically without an operation of an acceleration operator of the vehicle and a function for performing an informing for alerting a driver of the vehicle on the basis of road situation information acquired from an outside of the vehicle through a wireless communication.

Description of the Related Art

Conventionally, there is known an apparatus for displaying a lighting color (i.e., a present lighting color of a lamp) of a traffic light around a vehicle and a time required until the present lighting color changes to the next lighting color on a display of a navigation device of the vehicle (for example, see JP 2004-171459 A).

When the lighting color of the traffic light is constantly displayed on the display of the navigation device and the like, a driver of the vehicle feels botheration. Accordingly, the inventors of this application are developing an informing apparatus for performing an informing with respect to the driver when a particular situation that the driver should be alerted occurs.

For example, the informing apparatus may be configured to determine that the particular situation occurs when a distance between the traffic light which lights a red signal and the vehicle traveling toward the traffic light becomes a predetermined distance. Then, the informing apparatus informs the driver of the fact that the traffic light which the vehicle approaches lights the red signal to alert the driver when the informing apparatus determines that the particular situation occurs.

In this regard, when the driver has released an acceleration pedal of the vehicle even with the vehicle approaching the traffic light which lights the red signal, it can be determined by the release of the acceleration pedal that the driver knows that the traffic light lights the red signal. In this case, if the informing for alerting the driver is performed, the driver may feel the botheration due to that informing. Accordingly, one of measures for solving the problem is to configure the informing apparatus to perform the informing for alerting the driver when the particular situation occurs with the acceleration pedal being operated.

On the other hand, in some cases, the vehicle has a function for executing an automatic traveling control for causing the vehicle to travel automatically at a constant speed or causing the vehicle to travel automatically with an inter-vehicle distance between the own vehicle and a preceding vehicle being maintained at a predetermined distance. Such an automatic traveling control is generally called as a cruise control.

In this regard, when the particular situation occurs during the execution of the cruise control, the acceleration pedal is constantly released and thus, the informing is not performed. As a result, the suitable informing for alerting the driver is not performed.

The present invention has been made for solving the aforementioned problem. An object of the present invention is to provide a vehicle control apparatus which can appropriately inform the driver of the occurrence of the particular situation.

SUMMARY OF THE INVENTION

A vehicle control apparatus according to the present invention (hereinafter, this apparatus will be referred to as "the invention apparatus"), applied to a vehicle (10) having at least one road situation information acquisition device (81, 91) configured to acquire a road situation information on a road situation from an outside of the vehicle (10).

The invention apparatus comprises:
determination means (20, 80, 90) configured to determine whether or not a particular situation regarding a vehicle traveling occurs on the basis of the road situation information, the particular situation being a situation that a driver of the vehicle (10) should be alerted;
informing means (25, 26, 20) configured to perform an informing for alerting the driver when it is determined that the particular situation occurs; and
cruise means (20, 30, 40) configured to execute a cruise control for causing the vehicle (10) to travel automatically without an operation of an acceleration operator (33) of the vehicle (10).

For example, the particular situation is a situation that it is predicted that a traffic light (101a) which the vehicle (10) reaches first after the present time lights a red signal when the vehicle (10) reaches the traffic light (101a), the traffic light (101a) being installed at an intersection (101) and regulating a traveling of the vehicle (10).

The informing means (25, 26, 20) is configured to perform the informing (see a step 570 of FIG. 5) when it is determined that the particular situation occurs (see a determination "Yes" at a step 520), the cruise control is not executed (see a determination "No" at a step 530) and the acceleration operator (33) is operated (see a determination "Yes" at a step 560).

When the particular situation occurs and the acceleration operator such as an acceleration pedal is operated, the driver is unlikely to know the occurrence of the particular situation. Therefore, in this case, the invention apparatus performs the informing for alerting the driver. Thus, the driver can be informed of the occurrence of the particular situation when the driver is unlikely to know the occurrence of the particular situation.

On the other hand, the informing means (25, 26, 20) is configured to perform the informing (see a step 540 of FIG. 5) when it is determined that the particular situation occurs (see the determination "Yes" at the step 520) and the cruise control is executed (see a determination "Yes" at the step 530), independently of whether or not the acceleration operator is operated.

During the execution of the cruise control, the vehicle is accelerated or decelerated without the driver's operation of the acceleration operator. Therefore, during the execution of the cruise control, the driver does not operate the acceleration operator. Thus, when the particular situation occurs and the cruise control is executed, no operation of the acceleration operator may not mean that the driver knows the occurrence of the particular situation. In this case, the invention apparatus performs the informing for alerting the driver. Thus, the driver can be surely informed of the occurrence of the particular situation when the driver is unlikely to know the occurrence of the particular situation.

It should be noted that the determination means (20) may be configured to determine whether or not the particular situation occurs on the basis of a distance (Dobj) between a present position (Pj) of the vehicle (10) and a position of an object (B1 to B4), e.g., a traffic light (101a) lighting a red signal, which is included in the road situation information and requests a stop of the vehicle (10). In this case, it is determined whether or not the particular situation occurs in consideration of the distance between the vehicle and the object which requests the stop of the vehicle. In addition, the distance between the vehicle and the object is a factor which considerably influences whether or not a situation which the driver should pay attention regarding the driving of the vehicle occurs. Therefore, it can be accurately determined whether or not the particular situation occurs.

According to an aspect of the present invention, the determination means (20) may be configured to determine whether or not the particular situation occurs on the basis of the distance (Dobj) between the present position (Pj) of the vehicle (10) and the position of the object (B1 to B4) which requests a stop of the vehicle (10) and a traveling speed (SPDj) of the vehicle (10). In this case, it is determined whether or not the particular situation occurs in consideration of the distance between the vehicle and the object which requests the stop of the vehicle as well as the traveling speed of the vehicle (in particular, the time required for the vehicle to reach the object which requests the stop of the vehicle), the traveling speed of the vehicle being a factor which considerably influences whether or not a situation which the driver should pay attention regarding the driving of the vehicle occurs. Therefore, it can be further accurately determined whether or not the particular situation occurs.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

DESCRIPTION OF THE PREFERRED EMBODIMENTS

Below, a vehicle control apparatus according to an embodiment of the present invention will be described with reference to the drawings. Hereinafter, the vehicle control apparatus according to the embodiment will be referred to as "the embodiment control apparatus".

Figure 1:
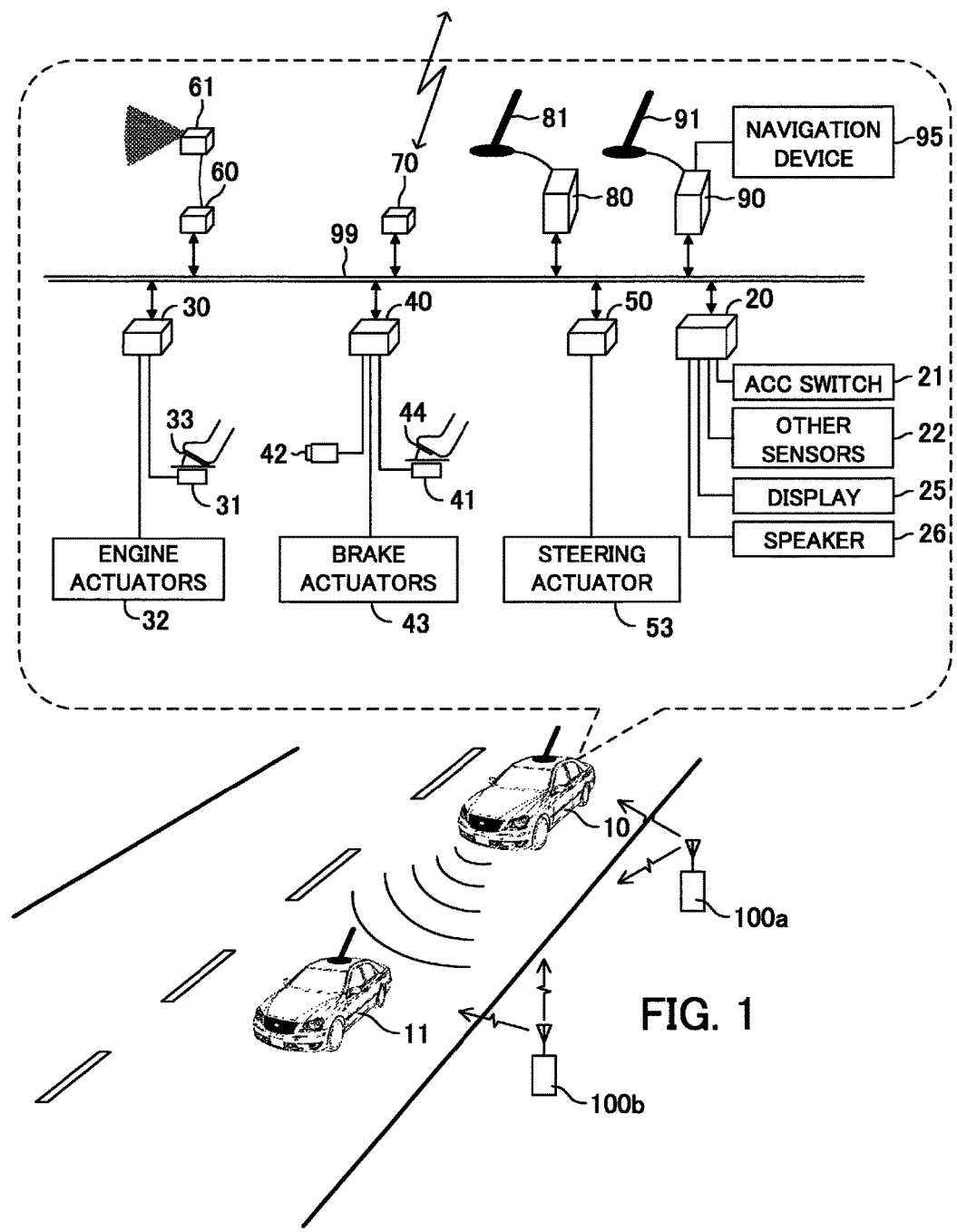
FIG. 1 is a general configuration view for showing a vehicle control apparatus according to an embodiment of the present invention and a vehicle installed with the vehicle control apparatus.

As shown in FIG. 1, the embodiment control apparatus is applied to a vehicle 10. Hereinafter, the vehicle 10 will be referred to as "the own vehicle 10". The embodiment control apparatus comprises a vehicle control ECU 20, an engine control ECU 30, an acceleration pedal operation amount sensor 31, a brake control ECU 40, a brake pedal operation amount sensor 41, a vehicle speed sensor 42, a steering control ECU 50, a sensor ECU 60, a radar sensor 61, a GPS device 70, a wireless communication control ECU 80, a wireless antenna 81, a navigation ECU 90 and a wireless antenna 91. A vehicle 11 traveling in front of the own vehicle 10 comprises the same components as the components of the own vehicle 10. Hereinafter, the vehicle 11 traveling in front of the own vehicle 10 will be referred to as "the preceding vehicle 11".

The vehicle control ECU 20 is configured to send and receive data to and from, that is, communicate with the engine control ECU 30, the brake control ECU 40, the steering control ECU 50, the sensor ECU 60, the GPS device 70, the wireless control ECU 80 and the navigation ECU 90 through a communication/sensor CAN (i.e., a communication/sensor Controller Area Network) 99. Each of the ECUs is an electric control unit including an electronic control circuit having, as a main component part, a microcomputer including a CPU, a ROM, a RAM, an interface and the like. The CPU realizes various functions described later by executing instructions or programs stored in the ROM (i.e., a memory).

Further, the vehicle control ECU 20 is electrically connected to a cruise control request switch 21 which is an ON-OFF switch and sensors 22 other than sensors described later. When the cruise control request switch 21 is set at an ON-position by a driver of the own vehicle 10, a cruise control described later (in this embodiment, an ACC described below) is requested to the vehicle control ECU 20. Hereinafter, the cruise control request switch 21 will be referred to as "the ACC switch 21".

The cruise control according to the present invention includes following controls (1) to (3).

(1) A cooperative following traveling control (CACC: Cooperative Adaptive Cruise Control).

(2) A following traveling control or an inter-vehicle distance control (ACC: Adaptive Cruise Control).

(3) A constant vehicle speed control (CC: Cruise Control).

The vehicle control ECU 20 is electrically connected to a display 25 and a speaker 26. The display 25 is provided at a position where the driver of the own vehicle 10 can see when the driver drives the own vehicle 10. The display 25 displays occurrences of following particular situations by characters or graphics. The display 25 is, for example, a combination meter for displaying various meter or a head-up display for displaying an image on a windshield of the own vehicle 10 or a hybrid system indicator of the vehicle 10 if the vehicle 10 is a hybrid vehicle.

The engine control ECU 30 is known and acquires detection signals from sensors (not shown) for detecting various amounts of operation states of an internal combustion engine (not shown), respectively. In particular, the engine control ECU 30 is electrically connected to the acceleration pedal operation amount sensor 31.

The acceleration pedal operation amount sensor 31 detects an amount Accp of an operation of an acceleration pedal 33 as an acceleration operator and outputs a detection signal representing the amount Accp to the engine control ECU 30. Hereinafter, the amount Accp will be referred to as "the acceleration pedal operation amount Accp".

Further, the engine control ECU 30 is electrically connected to engine actuators 32 such as a throttle valve actuator (not shown). The engine control ECU 30 activates the engine actuators 32 to change a torque generated by the internal combustion engine (not shown) of the own vehicle 10 and controls a traveling speed of the own vehicle 10 and an acceleration of the own vehicle 10.

The brake control ECU 40 is electrically connected to the brake pedal operation amount sensor 41, the vehicle speed sensor 42 and sensors (not shown) used for controlling a braking of the own vehicle 10. The brake control ECU 40 receives detection signals of these sensors, respectively.

The brake pedal operation amount sensor 41 detects an amount Brkp of an operation of a brake pedal 44 as a brake operator and outputs a detection signal representing the amount Brkp. Hereinafter, the amount Brkp will be referred to as "the brake pedal operation amount Brkp". The vehicle speed sensor 42 detects a traveling speed SPDj of the own vehicle 10 and outputs a detection signal representing the traveling speed SPDj. Hereinafter, the traveling speed SPDj of the own vehicle 10 will be referred to as "the own vehicle speed SPDj".

Brake actuators 43 of a friction braking device (not shown) and the like are electrically connected to the brake control ECU 40. The brake control ECU 40 activates the brake actuators 43 to generate friction forces at vehicle wheels of the own vehicle 10, respectively and controls the own vehicle speed SPDj and the acceleration including the deceleration of the own vehicle 10.

The steering control ECU 50 acquires detection signals from sensors (not shown) for detecting various traveling state amounts of the own vehicle 10, respectively. A steering actuator 53 such as an electric motor of an electric power steering device (not shown) is electrically connected to the steering control ECU 50.

The sensor ECU 60 is electrically connected to the radar sensor 61. The radar sensor 61 is a known millimeter wave radar sensor. The radar sensor 61 sends a millimeter wave (i.e., an output wave) ahead of the own vehicle 10. The millimeter wave is reflected by the preceding vehicle 11. The radar sensor 61 receives the reflected millimeter wave.

The sensor ECU 60 detects the preceding vehicle 11 traveling within a predetermined distance from the own vehicle 10 on the basis of the reflected millimeter wave received by the radar sensor 61. In addition, the sensor ECU 60 acquires a difference or relative vehicle speed ΔSPD between the own vehicle speed SPDj and a traveling speed SPDs of the preceding vehicle 11 (ΔSPD=SPDs−SPDj), an inter-vehicle distance D between the own vehicle 10 and the preceding vehicle 11 and the like in chronological order each time a predetermined time elapses on the basis of a phase difference between the millimeter wave sent from the radar sensor 61 and the reflected millimeter wave received by the radar sensor 61, a damping level of the reflected millimeter wave received by the radar sensor 61, a detection time of the reflected millimeter wave received by the radar sensor 61 and the like. Therefore, the sensor ECU 60 and the radar sensor 61 constitutes an inter-vehicle distance detection device.

The GPS device 70 is known and acquires a latitude and a longitude defining a position Pj of the traveling own vehicle 10 (i.e., an own vehicle position Pj) on the basis of a GPS signal sent from an artificial satellite.

The wireless communication control ECU 80 is electrically connected to the wireless antenna 81 for performing a wireless communication (i.e., a road-to-vehicle communication) between the own vehicle 10 and roadside communication devices each provided at a side of a road. In addition, the wireless control ECU 80 can perform the wireless communication (i.e., an inter-vehicle communication) between the own vehicle 10 and the other vehicles, using the wireless antenna 81.

The wireless communication control ECU 80 receives or acquires information on a vehicle traffic including road situation information on a road situation sent from radio wave roadside devices 100*a* (i.e., from outside of the own vehicle 10) through the wireless antenna 81 and stores the received information in the RAM of the wireless communication control ECU 80. Hereinafter, the information on the vehicle traffic will be referred to as "the infrastructure information". Concrete examples of the infrastructure information will be described later together with a description of the navigation ECU 90.

The navigation ECU 90 is electrically connected to the wireless antenna 91 and a navigation device 95. The navigation ECU 90 receives or acquires the infrastructure information sent from optical beacon roadside devices 100*b* through the wireless antenna 91 and stores the received infrastructure information in the RAM of the navigation ECU 90.

The infrastructure information acquired by the navigation ECU 90 and the wireless control ECU 80 includes at least following information A1 to A4 described with reference to FIGS. 2A and 2B.

Figure 2A:
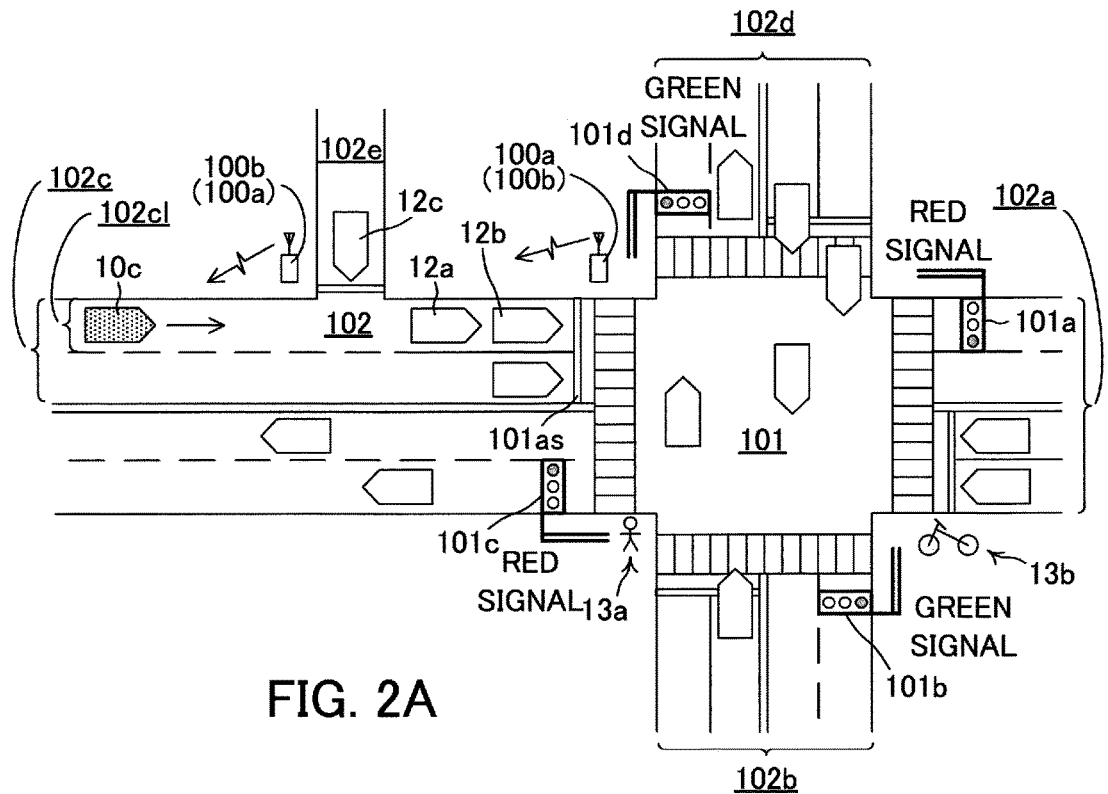
FIG. 2A is a view for showing a crossroad intersection and an area around the crossroad intersection.

(A1) Information on a present lighting state (a green signal lighting state, or a yellow signal lighting state or a red signal lighting state) of each of traffic lights 101*a* to 101*d* around the own vehicle 10*c*, information on a lighting cycle of each of the traffic lights 101*a* to 101*d* and the like (see FIG. 2A).

(A2) Information on a lane along which the other vehicles 12*a* and 12*b* around the own vehicle 10*c* travel, information on a position of each of the other vehicles 12*a* to 12*c*, information on a traveling speed of each of the other vehicles 12*a* to 12*c* and the like (see FIG. 2A).

(A3) Information on pedestrians 13*a* around the own vehicle 10*c* and/or bicycles 13*b* around the own vehicle 10*c* (i.e., pedestrian/bicycle information) (see FIG. 2A).

Figure 2B:
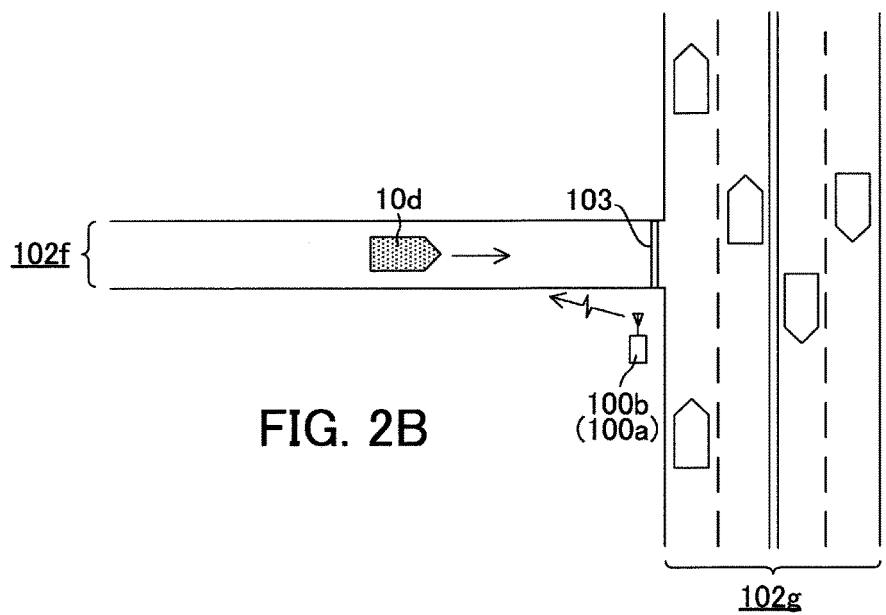
FIG. 2B is a view for showing a T-shaped intersection and an area around the T-shaped intersection.

(A4) Information on a shape of each of roads 102*a* to 102*g* around the own vehicle 10*c* or 10*d*, information on a position of each of momentary stop lines 103 provided on the roads around the own vehicle 10*d* and the like (see FIGS. 2A and 2B).

Further, the navigation ECU 90 acquires own vehicle information including the position Pj of the own vehicle 10, a traveling direction θj of the own vehicle 10 (i.e., an own vehicle traveling direction θj) and the like from the GPS device 70. As known, the navigation ECU 90 displays information on a traveling route of the own vehicle 10 to a destination and the like by the navigation device 95 on the basis of the acquired infrastructure information, a route information, the own vehicle information and the like.

Hereinafter, the position Pj of the own vehicle 10 will be referred to as "the own vehicle position Pj".

<Summary of Particular Situation Informing Control>

Next, a summary of a particular situation informing control executed by the embodiment control apparatus will be described. The vehicle control ECU 20 of the embodiment control apparatus is configured or programmed to execute a particular situation informing control for performing an particular situation informing for informing the driver of the own vehicle 10 of an occurrence of a situation regarding the traveling of the own vehicle 10 which the driver of the own vehicle 10 should be alerted by the display 25 and the speaker 26. Hereinafter, the situation regarding the traveling of the own vehicle 10 which the driver of the own vehicle 10 should be alerted will be referred to as "the particular situation".

In particular, the vehicle control ECU 20 acquires the infrastructure information from the wireless control ECU 80 and the navigation ECU 90 through the CAN 99, acquires the own vehicle position Pj from the GPS device 70 and acquires the own vehicle speed SPDj from the brake control ECU 40.

The vehicle control ECU 20 determines whether or not at least one of objects B1 to B4 described below which requests a stop of the own vehicle 10 exists on the basis of the acquired infrastructure information.

Object B1: The traffic light 101a installed at the intersection 101 at which the own vehicle 10c arrives first after the present time, the traffic light 101a regulating the traveling of the own vehicle 10c and being predicted to light the red signal when the own vehicle 10c arrives at a stop line 101as provided corresponding to the traffic signal 101a and defining a stop position of the own vehicle 10c (see FIG. 2A). It should be noted that a timing that the own vehicle 10c arrives at a stop line 101as is estimated on the basis of the present time, a distance between the own vehicle 10c and the stop line 101as calculated on the basis of the own vehicle position Pj and a position of the stop line 101as, the own vehicle speed SPDj and the like.

Object B2: The momentary stop line 103 at which the own vehicle 10 arrives first after the present time (see FIG. 2B).

Object B3: The other vehicles 12a and 12b which stop in a traffic lane 102c1, along which the own vehicle 10c travels, and exist in the traveling direction of the own vehicle 10c (see FIG. 2A).

Object B4: The other vehicle 12c which may move from a non-priority road (i.e., a side road) 102e into a priority road 102c, along which the own vehicle 10c travels, at a T-shaped intersection 102 (see FIG. 2A).

Further, the vehicle control ECU 20 calculates a required time T by dividing a distance Dobj between the present own vehicle position Pj and an existing position of each of the objects B1 to B4 by the own vehicle speed SPDj (T=Dobj/SPDj). When the required time T is equal to or smaller than a threshold time Tth, the vehicle control ECU 20 determines that the particular situation occurs.

When the particular situation occurs and the driver of the own vehicle 10 operates the acceleration pedal 33, the driver of the own vehicle 10 may not know the occurrence of the particular situation (i.e., the existence of at least one of the objects B1 to B4). Accordingly, when the vehicle control ECU 20 determines that the particular situation occurs without the acceleration pedal 33 being released, the vehicle control ECU 20 executes the particular situation informing control to perform the particular situation informing for informing the driver of the own vehicle 10 of the occurrence of the particular situation by the display 25 and the speaker 26.

On the other hand, when the particular situation occurs and the driver of the own vehicle 10 releases the acceleration pedal 33, the driver is likely to know the occurrence of the particular situation (i.e., the existence of at least one of the objects B1 to B4). Accordingly, when the vehicle control ECU 20 determines that the particular situation occurs with the acceleration pedal 33 being released, the vehicle control ECU 20 does not execute the particular situation informing control. Thereby, when the driver of the own vehicle 10 is likely to know the occurrence of the particular situation, the particular situation informing for informing the driver of the occurrence of the particular situation is not performed. Therefore, the driver can be prevented from feeling botheration.

<Adjustment Regarding Cruise Control>

The cruise control for automatically traveling the own vehicle 10 by controlling the acceleration of the own vehicle 10 such that an inter-vehicle distance D between the own vehicle 10 and the preceding vehicle 11 is maintained at a set inter-vehicle distance Dtgt or a target inter-vehicle distance Dtgt without the driver's operation of the acceleration pedal 33 is known. In this embodiment, the cruise control is the ACC (Adaptive Cruise Control). During an execution of the cruise control, an acceleration and a deceleration of the own vehicle 10 are automatically controlled. Thus, the driver of the own vehicle 10 releases the acceleration pedal 33, independently of whether or not the driver knows the occurrence of the particular situation. Therefore, even when the driver of the own vehicle 10 releases the acceleration pedal 33 with the particular situation occurring, the driver may not know the occurrence of the particular situation. In this case, it is preferred to perform the particular situation informing.

Accordingly, the embodiment control apparatus executes the particular situation informing control to perform the particular situation informing even when the acceleration pedal 33 is released, that is, independently of whether or not the acceleration pedal 33 is operated in the case that it is determined that the particular situation occurs and the cruise control is executed. On the other hand, the embodiment control apparatus executes the particular situation informing control to perform the particular situation informing when the acceleration pedal 33 is operated in case that it is determined that the particular situation occurs and the cruise control is not executed.

Such a particular situation informing control will be described with reference to FIGS. 3A, 3B, 4A and 4B. In an example shown in FIG. 3A, the embodiment control apparatus determines that the particular situation occurs at a time t30. At this time, the acceleration pedal operation amount Accp is larger than zero, that is, the acceleration pedal 33 is operated and the cruise control is not executed. Thus, the embodiment control apparatus starts to execute the particular situation informing control, thereby to perform the particular situation informing. Thereafter, when the acceleration pedal operation amount Accp becomes zero at a time t31, the embodiment control apparatus has determined that the particular situation occurs. At this time, the acceleration pedal 33 is released and the cruise control is not executed. Thus, the embodiment control apparatus terminates the execution of the particular situation informing control.

Figure 3A:
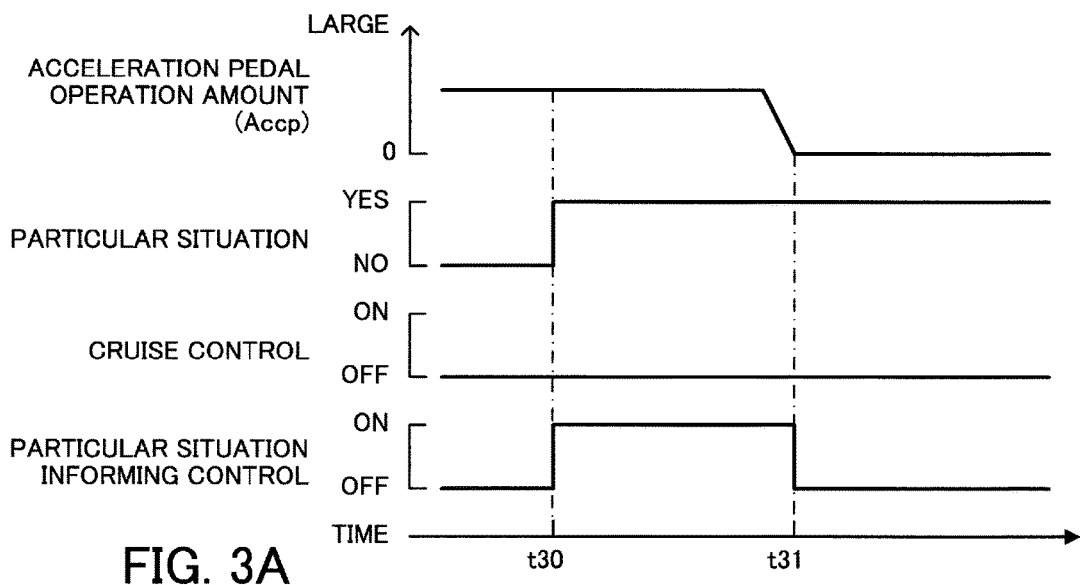
FIG. 3A is a view for showing a time chart used for describing a particular situation informing executed by the vehicle control apparatus.
Figure 3B:
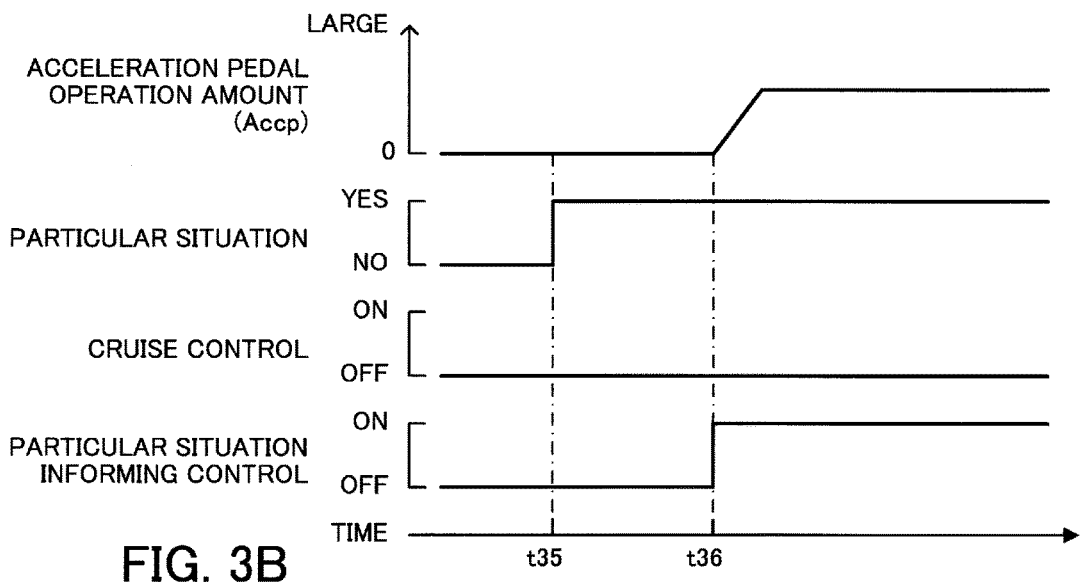
FIG. 3B is a view for showing a time chart used for describing the particular situation informing executed by the vehicle control apparatus.

On the other hand, in an example shown in FIG. 3B, the embodiment control apparatus determines that the particular situation occurs at a time t35. At this time, the acceleration pedal operation amount Accp is zero and the cruise control is not executed. Thus, the embodiment control apparatus does not start to execute the particular situation informing control. Thereafter, at a time t36, the acceleration pedal operation amount Accp becomes larger than zero. At this time, the embodiment control apparatus determines that the particular situation occurs with the acceleration pedal 33 being operated. Thus, the embodiment control apparatus starts to execute the particular situation informing control to inform the driver of the own vehicle 10 of the occurrence of the particular situation.

Figure 4A:
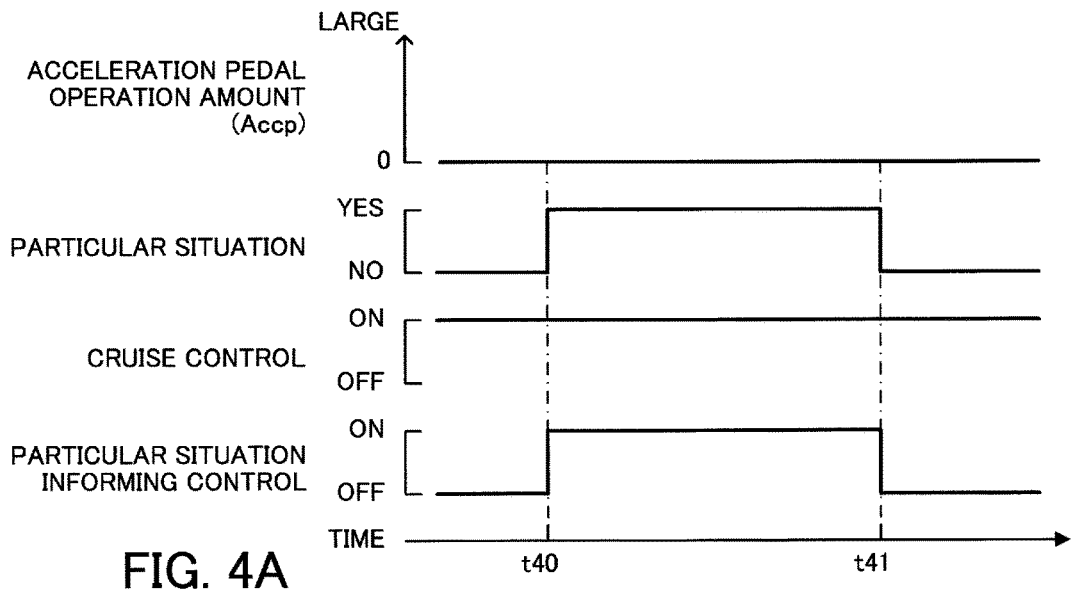
FIG. 4A is a view for showing a time chart used for describing the particular situation informing executed by the vehicle control apparatus.

In an example shown in FIG. 4A, the embodiment control apparatus determines that the particular situation occurs at a time t40. At this time, the acceleration pedal operation amount Accp is zero, however, the cruise control has been executed. Therefore, the embodiment control apparatus starts to execute the particular situation informing control to perform the particular situation informing. It should be noted that in the example shown in FIG. 4A, when the embodiment control apparatus does not determine that the particular situation occurs at a time t41, the embodiment control apparatus terminates the execution of the particular situation informing control.

Figure 4B:
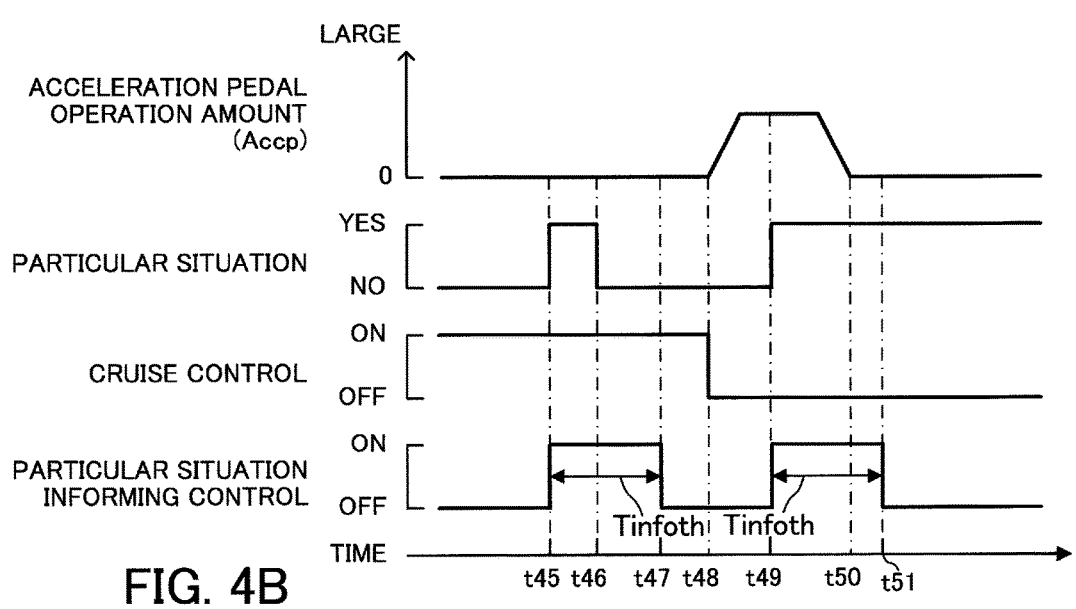
FIG. 4B is a view for showing a time chart used for describing the particular situation informing executed by the vehicle control apparatus.

Further, in an example shown in FIG. 4B, the embodiment control apparatus determine that the particular situation occurs at a time t45. At this time, the acceleration pedal operation amount Accp is zero, however, the cruise control is executed. Therefore, the embodiment control apparatus starts to execute the particular situation informing control to perform the particular situation informing. Thereafter, the embodiment control apparatus does not determine that the particular situation occurs at a time t46, however, a time Tinfo elapsing from a start of the execution of the particular situation informing control does not reach a predetermined threshold time Tinfoth. Thus, the embodiment control apparatus continues the execution of the particular situation informing control. Thereafter, when the time Tinfo reaches the predetermined threshold time Tinfoth at a time t47, the embodiment control apparatus terminates the execution of the particular situation informing control.

Thereafter, at a time t48, the acceleration pedal operation amount Accp becomes larger than zero and the execution of the cruise control is terminated. At this time, the embodiment control apparatus does not determine that the particular situation occurs. Thus, the embodiment control apparatus does not start to execute the particular situation informing control. Thereafter, at a time t49, the embodiment control apparatus determines that the particular situation occurs. At this time, the acceleration pedal operation amount Accp is larger than zero. Thus, the embodiment control apparatus starts to execute the particular situation informing control to perform the particular situation informing. Thereafter, at a time 50, the acceleration pedal operation amount Accp becomes zero. However, at this time, the time Tinfo elapsing from the start time of the execution of the particular situation informing control does not reach the predetermined threshold time Tinfoth. Thus, the embodiment control apparatus continues the execution of the particular situation informing control. Thereafter, when the time Tinfo reaches the predetermined threshold time Tinfoth at a time t51, the embodiment control apparatus terminates the execution of the particular situation informing control.

The summary of the particular situation informing control executed by the embodiment control apparatus has been described. Thereby, when the driver of the own vehicle 10 may not know the occurrence of the particular situation, that is, when the acceleration pedal 33 is not released or when the acceleration pedal 33 is released, however, the cruise control is executed, even in the case that it is determined that the particular situation occurs, the driver can be surely informed of the occurrence of the particular situation.

<Concrete Operation of Embodiment Control Apparatus>

Figure 5:
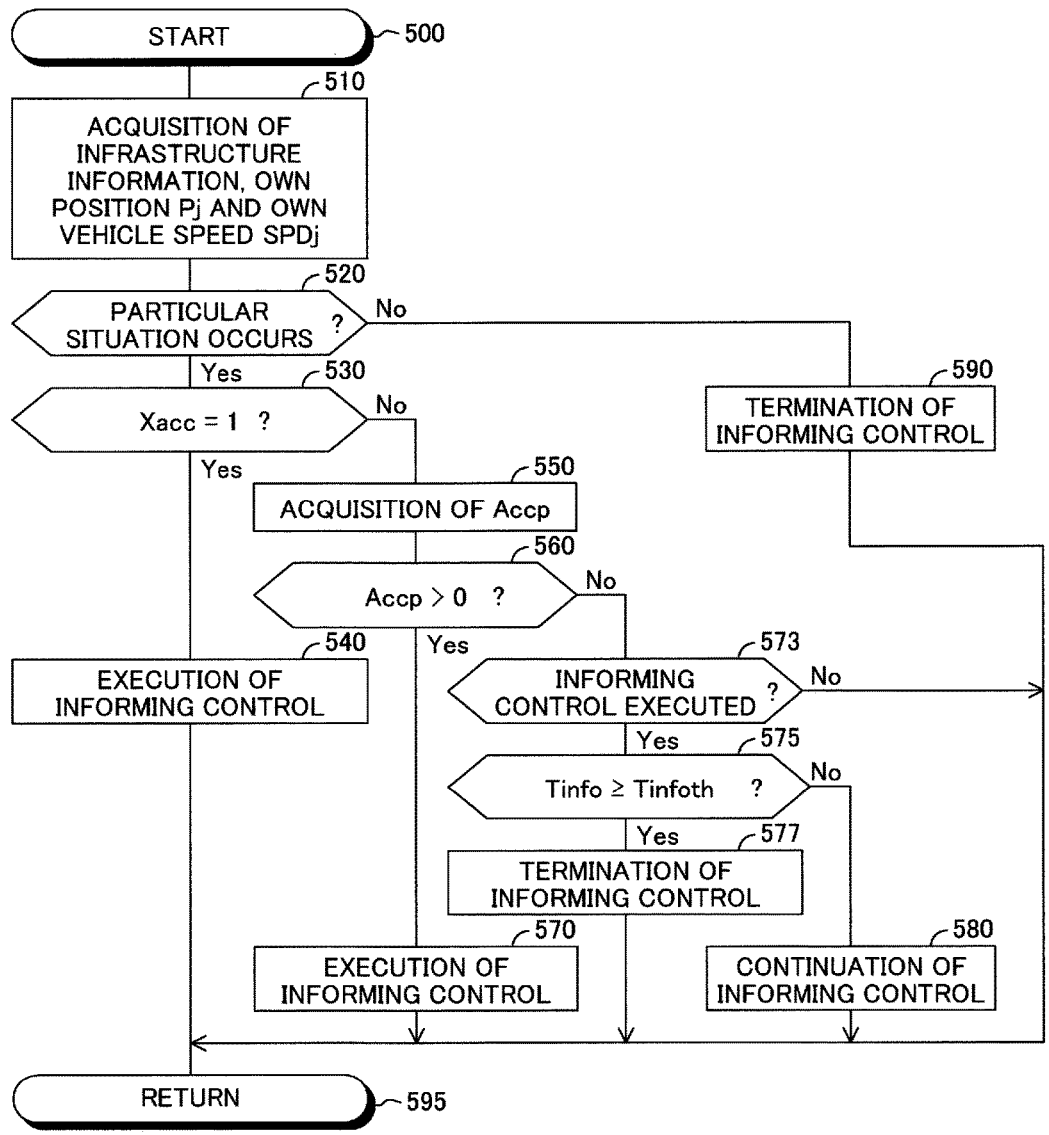
FIG. 5 is a view for showing a flowchart of a routine executed by a CPU of a vehicle control ECU shown in FIG. 1.

Next, a concrete operation of the embodiment control apparatus will be described. A CPU of the vehicle control ECU 20 of the embodiment control apparatus is configured or programmed to start a routine shown by a flowchart in FIG. 5 each time a predetermined time elapses. Hereinafter, the CPU of the vehicle control ECU 20 will be simply referred to as "the CPU". At a predetermined timing, the CPU starts a process from a step 500 of FIG. 5 and then, proceeds with the process to a step 510 to acquire the infrastructure information from the wireless control ECU 80 and the navigation ECU 90, the own vehicle position Pj from the GPS device 70 and the own vehicle speed SPDj from the brake control ECU 40.

Next, the CPU proceeds with the process to a step 520 to determine whether or not the particular situation occurs on the basis of the infrastructure information, the own vehicle position Pj and the own vehicle speed SPDj acquired at the step 510. In particular, the CPU determines whether or not the required time T (=Dobj/SPDj) is equal to or smaller than the threshold time Tth. When the particular situation occurs, the CPU determines "Yes" at the step 520 and then, proceeds with the process to a step 530 to determine whether or not a value of an ACC flag Xacc is "1".

The value of the ACC flag Xacc is set by a routine shown by a flowchart in FIG. 6 described later. When the value of the ACC flag Xacc is "1", the ACC flag Xacc represents that the cruise control is executed. On the other hand, when the value of the ACC flag Xacc is "0", the ACC flag Xacc represents that the cruise control is not executed.

When the value of the ACC flag Xacc is "1" upon the execution of the process of the step 530, the CPU determines "Yes" at the step 530 and then, proceeds with the process to a step 540 to execute the informing control to perform the particular situation informing for informing the driver of the own vehicle 10 of the occurrence of the particular situation, independently of a magnitude of the acceleration pedal operation amount Accp. Then, the CPU proceeds with the process to a step 595 to terminate the execution of this routine once.

On the other hand, when the value of the ACC flag Xacc is "0" upon the execution of the process of the step 530, the CPU determines "No" at the step 530 and then, proceeds with the process to a step 550 to acquire the acceleration pedal operation amount Accp from the engine control ECU 30.

Next, the CPU proceeds with the process to a step 560 to determine whether or not the acceleration pedal operation amount Accp acquired at the step 550 is larger than zero, that is, whether or not the driver of the own vehicle 10 operates the acceleration pedal 33. When the acceleration pedal operation amount Accp is larger than zero, the CPU determines "Yes" at the step 560 and then, proceeds with the process to a step 570 to execute the informing control to perform the particular situation informing. Then, the CPU proceeds with the process to the step 595 to terminate the execution of this routine once.

On the other hand, when the acceleration pedal operation amount Accp is zero upon the execution of the process of the step 560, the CPU determines "No" at the step 560 and then, proceeds with the process to a step 573 to determine whether or not the informing control is executed. When the informing control is executed, the CPU determines "Yes" at the step 573 and then, proceeds with the process to a step 575 to determine whether or not the elapsed time Tinfo elapsing from the start of the execution of the informing control which is now executed is equal to or larger than the predetermined threshold time Tinfoth.

When the elapsed time Tinfo is equal to or larger than the threshold time Tinfoth, the CPU determines "Yes" at the step 575 and then, proceeds with the process to a step 577 to terminate the execution of the informing control. Then, the CPU proceeds with the process to the step 595 to terminate the execution of this routine once.

On the other hand, when the elapsed time Tinfo is smaller than the threshold time Tinfoth upon the execution of the process of the step 575, the CPU determines "No" at the step 575 and then, proceeds with the process to a step 580 to continue the execution of the informing control. Then, the CPU proceeds with the process to the step 595 to terminate the execution of this routine once.

It should be noted that when the informing control is not executed upon the execution of the process of the step 573, the CPU determines "No" at the step 573 and then, proceeds with the process directly to the step 595 to terminate the execution of this routine once.

Further, when the particular situation does not occur upon the execution of the process of the step 520, the CPU determines "No" at the step 520 and then, proceeds with the process to a step 590 to terminate the informing control if the informing control is executed. Then, the CPU proceeds with the process to the step 595 to terminate the execution of this routine once.

Figure 6:
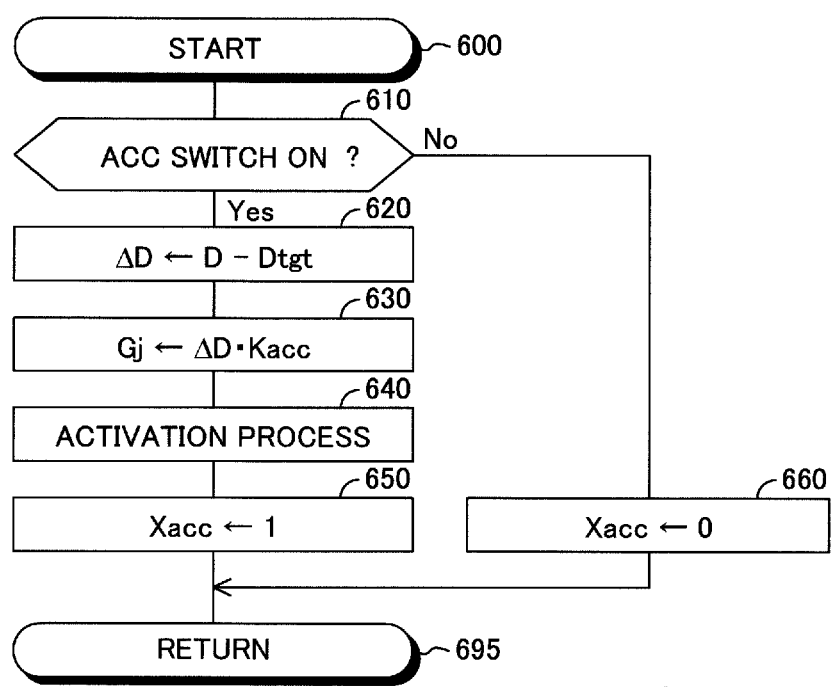
FIG. 6 is a view for showing a flowchart of a routine executed by the CPU.

Further, the CPU is configured or programmed to execute a routine shown by a flowchart in FIG. 6. Therefore, at a predetermined timing, the CPU starts a process from a step 600 of FIG. 6 and then, proceeds with the process to a step 610 to determine whether or not the ACC switch 21 is set at the ON-position.

It should be noted that when the ACC switch 21 is set at an OFF-position, the engine control ECU 30 controls the engine actuators 32 on the basis of the acceleration pedal operation amount Accp, a rotation speed of the internal combustion engine and the like and the brake control ECU 40 controls the brake actuators 43 on the basis of the brake pedal operation amount Brkp, the own vehicle speed SPDj (or vehicle wheel rotation speed of vehicle wheels of the own vehicle 10) and the like.

When the ACC switch 21 is set at the ON-position upon the execution of the process of the step 610, the CPU determines "Yes" at the step 610 and then, sequentially executes processes of steps 620 to 650. Then, the CPU proceeds with the process to a step 695 to terminate the execution of this routine once.

Step 620: The CPU calculates the difference $\Delta D$ between the present inter-vehicle distance D between the own vehicle 10 and the preceding vehicle 11 and the set inter-vehicle distance Dtgt ($\Delta D = D - Dtgt$). When the present inter-vehicle distance D is larger than the set inter-vehicle distance Dtgt, the calculated difference $\Delta D$ is a positive value. On the other hand, when the present inter-vehicle distance D is smaller than the set inter-vehicle distance Dtgt, the calculated difference $\Delta D$ is a negative value. Hereinafter, the difference $\Delta D$ will be referred to as "the inter-vehicle distance difference $\Delta D$".

Step 630: The CPU calculates a requested acceleration Gj which is the acceleration of the own vehicle 10 necessary for causing the inter-vehicle distance D to correspond to the set inter-vehicle distance Dtgt by multiplying the inter-vehicle distance difference $\Delta D$ calculated at the step 620 by a predetermined correction coefficient Kacc. It should be noted that when the inter-vehicle distance difference $\Delta D$ is a positive value, the correction coefficient Kacc which is equal to or smaller than "1" is used. On the other hand, when the inter-vehicle distance difference $\Delta D$ is a negative value, the correction coefficient Kacc which is "1" is used. Further, the set inter-vehicle distance Dtgt may be a predetermined constant value or a value optionally set by the driver of the own vehicle 10.

Step 640: The CPU executes processes for activating the engine actuators 32 and the brake actuators 43 such that the requested acceleration Gj calculated at the step 630 is achieved. Thereby, when the requested acceleration Gj is larger than zero, the own vehicle 10 is accelerated. On the other hand, when the requested acceleration Gj is smaller than zero, the own vehicle 10 is decelerated. As a result, the inter-vehicle distance D is maintained at the set inter-vehicle distance Dtgt. It should be noted that when the preceding vehicle 11 does not exist in front of the own vehicle 10, the CPU executes a process for setting the requested acceleration Gj such that the own vehicle speed SPDj corresponds to a separately-set target vehicle speed in place of the processes of the steps 620 and 630.

Step 650: The CPU sets the value of the ACC flag Xacc to "1". As described above, the ACC flag Xacc is used at the step 530 of FIG. 5.

It should be noted that when the ACC switch 21 is set at the OFF-position upon the execution of the process of the step 610, the CPU determines "No" at the step 610 and then, proceeds with the process to a step 660 to set the value of the ACC flag Xacc to "0". Then, the CPU proceeds with the process to the step 695 to terminate the execution of this routine once.

The concrete operation of the embodiment control apparatus has been described. According to the embodiment control apparatus, the driver can be surely informed of the occurrence of the particular situation (see the steps 540 and 570) when the driver may not know the occurrence of the particular situation (see the determinations "Yes" at the steps 530 and 560, respectively) with the particular situation occurring (the determination "Yes" at the step 520).

The present invention is not limited to the embodiment and various modifications can be employed within the scope of the present invention.

For example, the object which leads to a need for determining whether or not the particular situation occurs includes the objects B1 to B4 as well as objects which the driver should be alerted when the time T required for the own vehicle 10 to reach each of the objects becomes equal to or smaller than the threshold time Tth.

Further, the embodiment control apparatus may be configured to determine that the particular situation occurs when the distance Dobj between the own vehicle position Pj and the position of any of the objects B1 to B4 is equal to or smaller than a threshold distance Dth.

Further, the embodiment control apparatus may be configured to determine that an informing condition which the informing control should be executed is satisfied when the particular situation occurs and the brake pedal 44 is not operated. In this case, when the brake pedal operation amount Brkp is zero upon the execution of the process of the step 560 of FIG. 5, the CPU determines "Yes" at the step 560 and then, proceeds with the process to the step 570. On the other hand, when the brake pedal operation amount Brkp is larger than zero upon the execution of the process of the step 560, the CPU determines "No" at the step 560 and then, proceeds with the process to the step 577.

Further, the cooperative following traveling control (CACC) which is one of the cruise controls is, for example, a following control. That is, when the cooperative following traveling control is executed, the acceleration of the own vehicle 10 necessary for causing the own vehicle 10 to travel accurately following the preceding vehicle 11 is calculated on the basis of data of operation state amounts such as a requested acceleration and an actual acceleration of the preceding vehicle 11 received from the preceding vehicle 11 through the wireless communication. In addition, the requested acceleration Gj is calculated on the basis of the thus-calculated acceleration of the own vehicle 10 and the acceleration of the own vehicle 10 necessary for maintaining the inter-vehicle distance D at the set inter-vehicle distance Dtgt. Then, the acceleration of the own vehicle 10 is controlled such that the requested acceleration Gj is achieved (for example, see JP 2015-51716 A).

Further, the constant vehicle speed control is a control for controlling the acceleration of the own vehicle 10 such that the own vehicle speed SPDj is maintained at the set vehicle speed SPDtgt.

What is claimed is:

1. A vehicle control apparatus, applied to a vehicle having at least one road situation information acquisition device configured to acquire road situation information on a road situation from a device outside of the vehicle, the vehicle control apparatus comprising:
   one or more electronic control units configured to:
      determine whether or not a particular situation regarding a vehicle traveling occurs on the basis of the road situation information from the device outside the vehicle, the particular situation being a situation that a driver of the vehicle should be alerted;
      execute a cruise control for causing the vehicle to travel automatically without an operation of an acceleration operator of the vehicle;
      perform alerting the driver when the one or more electronic control units determines (1) that the particular situation occurs, (2) that the cruise control is not executed and (3) that the acceleration operator is operated; and
      perform the alerting the driver when the one or more electronic control units determines (1) that the particular situation occurs and (2) that the cruise control is executed, independently of whether or not the acceleration operator is operated.

2. The vehicle control apparatus according to claim 1, wherein the one or more electronic control units is configured to determine whether or not the particular situation occurs on the basis of a distance between a present position of the vehicle and a position of an object which is included in the road situation information and requests a stop of the vehicle.

3. The vehicle control apparatus according to claim 2, wherein the one or more electronic control units is configured to determine whether or not the particular situation occurs on the basis of the distance and a traveling speed of the vehicle.

4. The vehicle control apparatus according to claim 1, wherein the particular situation is a situation that the one or more electronic control units predicts that a traffic light lights a red signal when the vehicle reaches the traffic light, the traffic light being installed at an intersection and regulating a traveling of the vehicle.

* * * * *